(12) United States Patent
Iwasaki et al.

(10) Patent No.: US 10,538,178 B2
(45) Date of Patent: Jan. 21, 2020

(54) ENTRY/EXIT SUPPORT STRUCTURE OF VEHICLE SEAT

(71) Applicant: TOYOTA JIDOSHA KABUSHIKI KAISHA, Toyota-shi, Aichi-ken (JP)

(72) Inventors: Keita Iwasaki, Toyota (JP); Shota Higashihara, Chiryu (JP); Kengo Suzuki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 15/819,447

(22) Filed: Nov. 21, 2017

(65) Prior Publication Data

US 2018/0208083 A1   Jul. 26, 2018

(30) Foreign Application Priority Data

Jan. 20, 2017   (JP) ................. 2017-008053

(51) Int. Cl.
| | |
|---|---|
| *B60N 2/16* | (2006.01) |
| *B60N 2/08* | (2006.01) |
| *B60N 2/90* | (2018.01) |
| *A47C 7/14* | (2006.01) |
| *B60N 2/07* | (2006.01) |
| *B60N 2/12* | (2006.01) |

(52) U.S. Cl.
CPC ........... *B60N 2/1685* (2013.01); *A47C 7/14* (2013.01); *B60N 2/0727* (2013.01); *B60N 2/08* (2013.01); *B60N 2/0843* (2013.01); *B60N 2/12* (2013.01); *B60N 2/99* (2018.02); *B60N 2/0715* (2013.01)

(58) Field of Classification Search
None
See application file for complete search history.

(56) References Cited

U.S. PATENT DOCUMENTS

| 4,522,445 A * | 6/1985 | Goldner ............... B60N 2/1892 |
| | | 297/284.9 |
| 6,039,402 A * | 3/2000 | Nemoto .................. B60N 2/02 |
| | | 296/65.05 |

(Continued)

FOREIGN PATENT DOCUMENTS

| CN | 206653953 U | * 11/2017 |
| CN | 206749578 U | * 12/2017 |

(Continued)

*Primary Examiner* — David E Allred
(74) *Attorney, Agent, or Firm* — Oliff PLC

(57) ABSTRACT

An entry/exit support structure of a vehicle seat has: a side support portion that is provided in a seat transverse direction of a seat cushion, and that is displaced in a seat vertical direction; a seat sliding mechanism that supports the seat cushion to slide in a seat front-rear direction, and that has a locking device restricting sliding of the seat cushion in the seat front-rear direction; and a side support portion restricting mechanism having a release operation portion. In a state in which the release operation portion is positioned at a lock position, displacement of the side support portion in the seat vertical direction is restricted. In a state in which the release operation portion is positioned at a release position, displacement of the side support portion in the seat vertical direction is permitted and sliding of the seat cushion in the seat front-rear direction is permitted.

7 Claims, 6 Drawing Sheets

(56) References Cited

U.S. PATENT DOCUMENTS

| | | | | |
|---|---|---|---|---|
| 6,203,106 B1* | 3/2001 | Nearing | ................ | A61G 5/107 |
| | | | | 297/284.9 |
| 6,802,563 B1* | 10/2004 | Mysliwiec | ............... | B60N 2/99 |
| | | | | 297/284.9 |
| 6,840,577 B2* | 1/2005 | Watkins | ............... | A61G 5/1064 |
| | | | | 297/284.9 |
| 7,108,323 B2* | 9/2006 | Welch | ................. | B60N 2/3011 |
| | | | | 297/284.9 |
| 7,607,735 B2* | 10/2009 | Kuno | .................. | B60N 2/0232 |
| | | | | 297/284.6 |
| 7,726,739 B2* | 6/2010 | Wain | ..................... | B60N 2/986 |
| | | | | 297/284.9 |
| 2007/0120407 A1* | 5/2007 | Kojima | ................ | B60N 2/0705 |
| | | | | 297/344.11 |
| 2009/0218858 A1* | 9/2009 | Lawall | ................ | B60N 2/4235 |
| | | | | 297/216.1 |
| 2012/0169101 A1* | 7/2012 | Suzuki | .................... | B60N 2/12 |
| | | | | 297/354.1 |
| 2012/0299361 A1* | 11/2012 | Domoto | ............... | B60N 2/0705 |
| | | | | 297/463.1 |
| 2012/0318948 A1* | 12/2012 | Yamada | ............... | B60N 2/0727 |
| | | | | 248/429 |
| 2013/0161991 A1* | 6/2013 | Otsuka | .................. | B60N 2/062 |
| | | | | 297/344.21 |
| 2013/0206951 A1* | 8/2013 | Nagura | .................... | B60N 2/08 |
| | | | | 248/429 |
| 2014/0361571 A1 | 12/2014 | Line et al. | | |
| 2016/0207423 A1 | 7/2016 | Kolich et al. | | |
| 2018/0194255 A1* | 7/2018 | Mochizuki | ............... | B60N 2/02 |

FOREIGN PATENT DOCUMENTS

| | | | | |
|---|---|---|---|---|
| CN | 206749580 U | * | 12/2017 | |
| DE | 20022580 U1 | | 11/2001 | |
| DE | 102014210790 A1 | | 12/2014 | |
| DE | 102016100316 A1 | | 7/2016 | |
| GB | 2403139 A | | 12/2004 | |
| JP | 60206742 A | * | 10/1985 | ............... B60N 2/99 |
| JP | 61215132 A | * | 9/1986 | |
| JP | H05-220025 A | | 8/1993 | |
| WO | 2017/006858 A1 | | 1/2017 | |

* cited by examiner

ENTRY/EXIT SUPPORT STRUCTURE OF VEHICLE SEAT

CROSS-REFERENCE TO RELATED APPLICATION

This application claims priority under 35 USC 119 from Japanese Patent Application No. 2017-008053 filed Jan. 20, 2017, the disclosure of which is incorporated by reference herein.

BACKGROUND

Technical Field

The present invention relates to an entry/exit support structure of a vehicle seat.

Related Art

Japanese Patent Application Laid-Open (JP-A) No. H05-220025 discloses a side support structure of a seat cushion for making it easy to enter a vehicle and exit from the vehicle. In accordance with the structure disclosed in the aforementioned document, a side support portion that is provided at a transverse direction side portion of a seat cushion can be tilted in the vertical direction. Further, by sliding the seat to a position for the time of entry/exit, locking of the side support portion is released, and the side support portion can be tilted toward the lower side. Due thereto, the side support portion becoming a hindrance to entry of a vehicle occupant into the vehicle and exit from the vehicle can be suppressed (a deterioration in the ease of entry into and exit from the vehicle can be suppressed).

However, in the structure described in JP-A No. H05-220025, the side support portion can be tilted toward the lower side only when the seat is positioned at a predetermined position. Thus, there is room for improvement from the standpoint of improving the ease of entry and exit of a vehicle occupant into and from the vehicle.

SUMMARY

In view of the above-described circumstances, the present invention provides an entry/exit support structure of a vehicle seat that can improve the ease of entry and exit of a vehicle occupant into and from the vehicle.

An entry/exit support structure of a vehicle seat of a first aspect of the present invention has: a side support portion that is provided at at least one side in a seat transverse direction of a seat cushion on which a vehicle occupant sits, and that is configured to be displaced in a seat vertical direction; a seat sliding mechanism that supports the seat cushion to be configured to slide in a seat front-rear direction, and that has a locking device that restricts sliding of the seat cushion in the seat front-rear direction; and a side support portion restricting mechanism that has a release operation portion operated by a vehicle occupant. In a state in which the release operation portion is positioned at a lock position, displacement of the side support portion in the seat vertical direction is restricted, and, in a state in which the release operation portion is positioned at a release position, displacement of the side support portion in the seat vertical direction is permitted and sliding of the seat cushion in the seat front-rear direction is permitted.

In accordance with the first aspect, the side support portion that can be displaced in the seat vertical direction is provided at at least one side in the seat transverse direction of the seat cushion on which a vehicle occupant sits. The side support portion can be displaced in the seat vertical direction. Further, the seat cushion is supported by the seat sliding mechanism so as to be able to slide in the seat front-rear direction.

Here, in the state in which the release operation portion of the side support portion restricting mechanism is positioned at the restricting position, displacement in the seat vertical direction is restricted. Further, in the state in which the release operation portion is positioned at the permitting position due to the vehicle occupant operating the release operation portion, or the like, displacement of the side support portion in the seat vertical direction is permitted, and in addition, sliding of the seat cushion in the seat front-rear direction is permitted. Due thereto, in the state in which the seat cushion is moved to a desired position in the seat front-rear direction, the side support portion can be displaced toward the seat lower side. Due thereto, the side support portion becoming a hindrance to entry of a vehicle occupant into the vehicle and exiting of a vehicle occupant from the vehicle can be suppressed, and a deterioration in the ease of entry into and exit from the vehicle can be suppressed.

In an entry/exit support structure of a vehicle seat of a second aspect of the present invention, in the first aspect, a side support portion urging member is provided around the side support portion, and the side support portion urging member urges the side support portion in a direction of being displaced toward a seat lower side.

In accordance with the second aspect, due to the side support portion urging member being provided, it can be made such that the side support portion is easily displaced toward the seat lower side at the time when the release operation portion is moved to the permitting position.

In an entry/exit support structure of a vehicle seat of a third aspect of the present invention, in the first aspect or the second aspect, the release operation portion is provided at a seat lower side of the side support portion.

In accordance with the third aspect, due to the release operation portion being disposed at the above-described position, the side support portion can be displaced while the vehicle occupant operates the release operation portion.

In an entry/exit support structure of a vehicle seat of a fourth aspect of the present invention, in any one of the first through the third aspects, a slide permitting operation portion is provided at a lower side of the seat cushion at a position different than the release operation portion, and, due to the slide permitting operation portion being operated, sliding of the seat cushion, which is in a state in which displacement of the side support portion in the seat vertical direction is restricted, in the seat front-rear direction is permitted.

In accordance with the fourth aspect, due to the slide permitting operation portion being operated, the seat cushion can be slid in the seat front-rear direction in a state in which displacement of the side support portion is restricted.

BRIEF DESCRIPTION OF THE DRAWINGS

Exemplary embodiments of the present invention will be described in detail based on the following figures, wherein.

DETAILED DESCRIPTION

Figure 1:
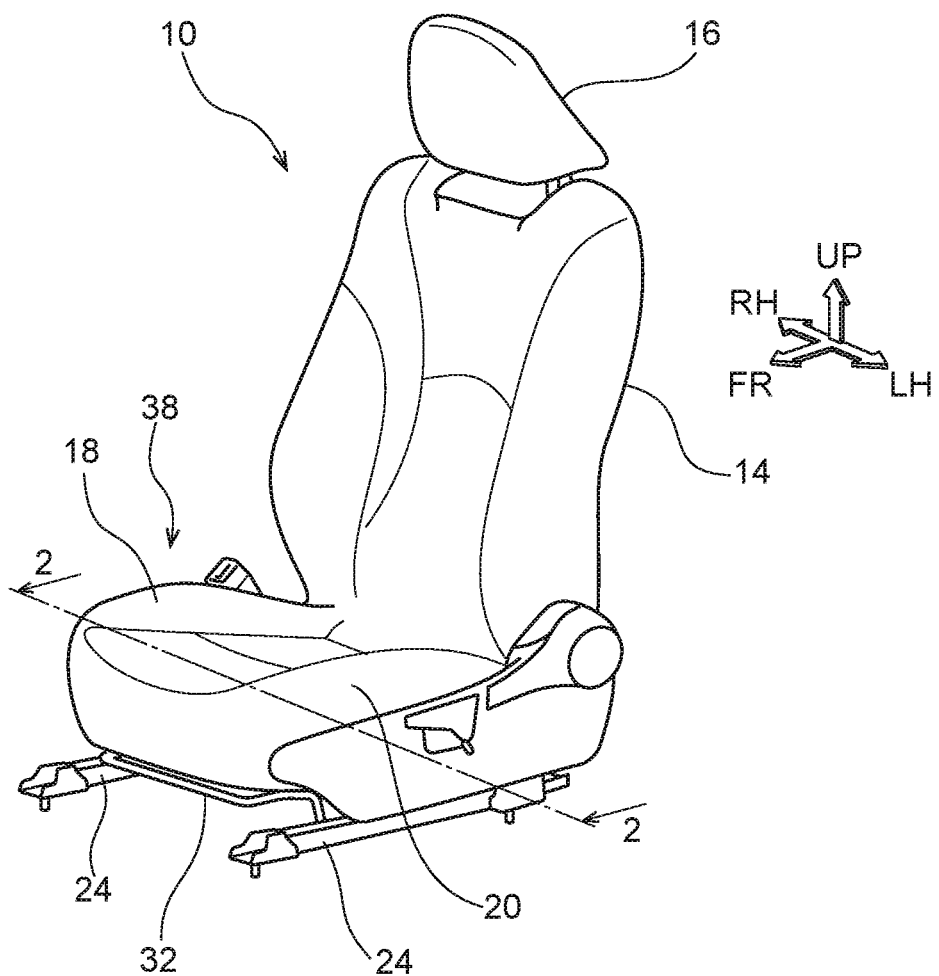
FIG. 1 is a perspective view in which a vehicle seat is seen from an obliquely front side.
Figure 2:
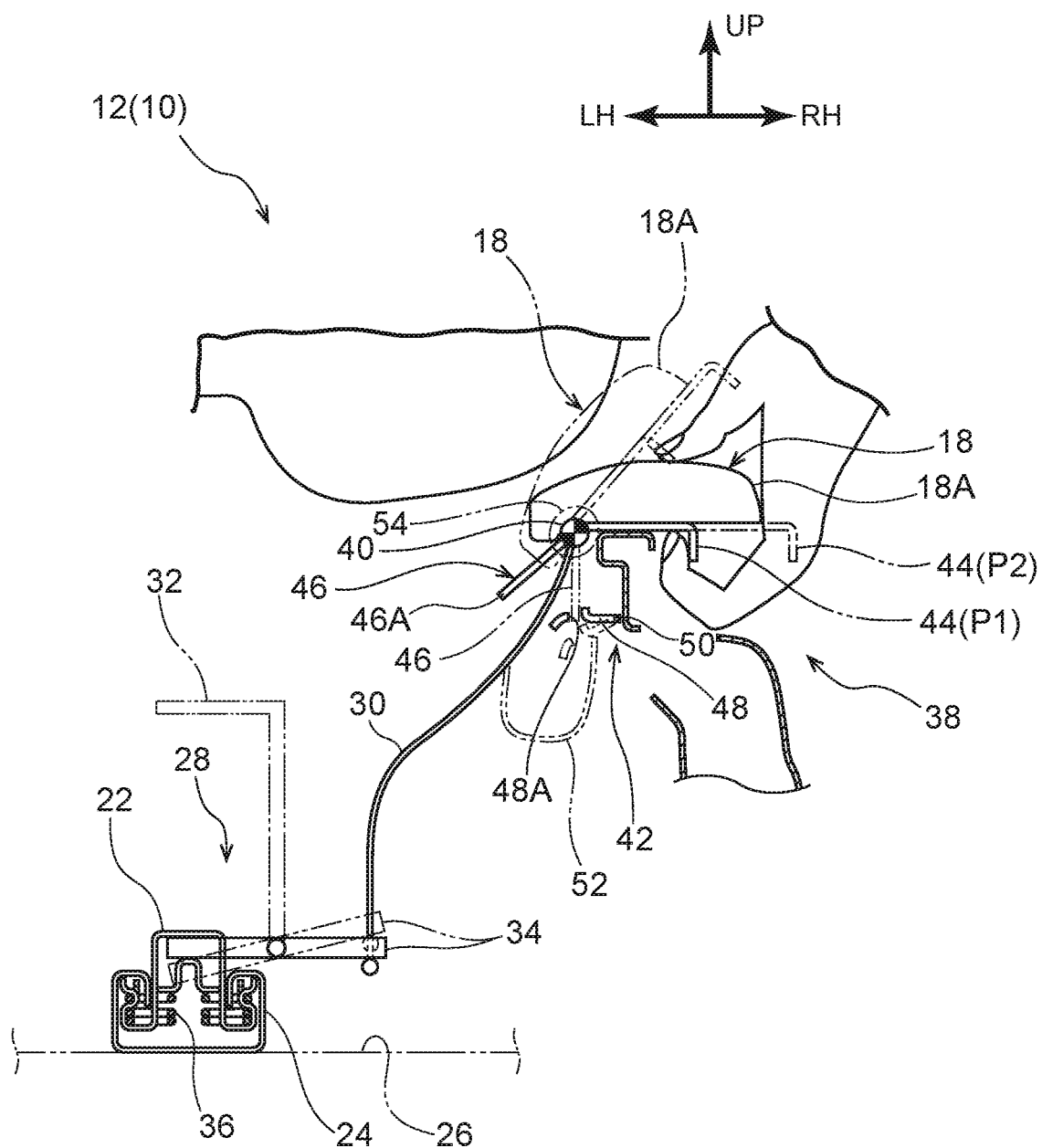
FIG. 2 is a cross-sectional view showing a side support portion and the like of the vehicle seat that are cut along a line corresponding to line 2-2 shown in FIG. 1.

A vehicle seat, to which is applied an entry/exit support structure of a vehicle seat relating to an embodiment of the present invention, is described by using FIG. 1 and FIG. 2. Note that, in the following explanation, when description is given by using the front-rear, left-right and vertical directions, they refer to the front-rear, the left-right and the vertical directions as seen from a vehicle occupant seated in the vehicle seat. Further, arrow FR that is shown appropriately in the respective drawings indicates the forward direction, arrow UP indicates the upward direction, arrow RH indicates the rightward direction, and arrow LH indicates the leftward direction.

As shown in FIG. 1, a vehicle seat 10 relating to the present embodiment is used as a driver's seat. The vehicle seat 10 has a seat cushion 12 that supports the buttocks and the femoral regions of a vehicle occupant, a seatback 14 that supports the upper body of the vehicle occupant, and a headrest 16 that supports the head portion of the vehicle occupant.

Side support portions 18, 20 that extend along the seat front-rear direction are provided at the seat transverse direction both end portions of the seat cushion 12. Moreover, the side support portion 18 that is provided at the seat right side is structured so as to be able to tilt (so as to be able to be displaced) by a side support portion moving device 38 that serves as a side support portion restricting mechanism and that is described later. As a result, the seat transverse direction outer side end portion of the side support portion 18 can be raised and lower in the seat vertical direction. Note that, in the present embodiment, the side support portion 18 that is at the right side is made to be tiltable in order to facilitate the vehicle occupant getting into and getting out of the vehicle seat 10 that is used as the driver's seat, but both the left and right side support portions 18, 20 may be made to be tiltable.

As shown in FIG. 1 and FIG. 2, the vehicle seat 10 is fixed to a floor 26 of the vehicle body via upper rails 22 and lower rails 24 and the like that structure portions of a seat sliding mechanism that is provided at the lower side of the seat cushion 12. The vehicle seat 10 (the seat cushion 12) can be slid in the front-rear direction due to the upper rails 22 being moved along the lower rails 24. Here, in the present embodiment, movement of the upper rails 22 with respect to the lower rails 24 is restricted due to a slide locking device 28 being operated. Further, due to a slide lock releasing lever 34 of the slide locking device 28 being tilted toward one side via a first cable 30 and a loop handle 32 that serves as a slide permitting operation portion, restricting of the movement of the upper rails 22 with respect to the lower rails 24 by the slide locking device 28 is released, and the vehicle seat 10 can be slid in the front-rear direction. Note that, due to the loop handle 32 being provided at the lower side of the front end portion of the seat cushion 12, the loop handle 32 is operated by the vehicle occupant who is seated in the vehicle seat 10. Further, in a state in which the first cable 30 is not being pulled, or in a state in which the loop handle 32 is not being operated, the slide lock releasing lever 34 that has been titled returns to its original position due to a lock spring 36 that is provided within the lower rail 24.

A side support portion moving device 38 that is a main portion of the present embodiment is described next.

As shown in FIG. 2, the side support portion moving device 38 has a shaft portion 40, which supports the side support portion 18 so as to be tiltable with the front-rear direction being the axial direction, and a side support portion locking device 42 that holds the side support portion 18 in a state of being tilted toward the upper side (a state in which an end portion 18A at the right side of the side support portion 18 is positioned toward the upper side). Further, side support portion moving device 38 has a support lock releasing lever 44 that serves as a release operation portion that, by being operated, releases the holding of the side support portion 18 by the side support portion locking device 42.

The side support portion locking device 42 has a lock plate 46, whose proximal end side is joined to the shaft portion 40 and that is formed in the shape of a plate that extends toward the radial direction outer side of the shaft portion 40, and an engaged plate 48 that has a lock hole 48A that restricts rotation of the shaft portion 40 due to a distal end portion 46A of the lock plate 46 engaging therewith. This engaged plate 48 is supported so as to be tiltable via a pin 50. Further, when the engaged plate 48 is pulled via a second cable 52, the engaged plate 48 is tilted toward one side, and the distal end portion 46A of the lock plate 46 is pulled-out from the lock hole 48A of the engaged plate 48. Due thereto, restricting of the rotation of the shaft portion 40 is released, i.e., the holding of the side support portion 18 is released, and the side support portion 18 can be tilted toward the lower side. Note that the engaged plate 48 is urged by an unillustrated urging member in the direction of tilting toward the other side.

Here, in the present embodiment, a side support portion urging spring 54, which serves as a side support portion urging member and urges the side support portion 18 in the direction of tilting toward the lower side, is provided between the shaft portion 40 and the side support portion 18. Therefore, when the holding of the side support portion 18 by the side support portion locking device 42 is released, the side support portion 18 is titled toward the lower side by the urging force of the side support portion urging spring 54.

The support lock releasing lever 44 is formed in the shape of a plate whose end portion at the seat transverse direction outer side is bent in an L-shape. This support lock releasing lever 44 is slidably supported at the lower side end portion of the side support portion 18. The first cable 30 and the second cable 52 are connected to this support lock releasing lever 44. Due to the support lock releasing lever 44 being slid from a lock position P1 to a release position P2, and the first cable 30 and the second cable 52 being pulled via the support lock releasing lever 44, the vehicle seat 10 can be slid in the front-rear direction, and the side support portion 18 can be tilted toward the lower side.

(Operation and Effects of Present Embodiment)

Operation and effects of the present embodiment are described next.

First, the time when a vehicle occupant enters into the vehicle is described by using FIG. 3 and FIG. 4.

Figure 3A:
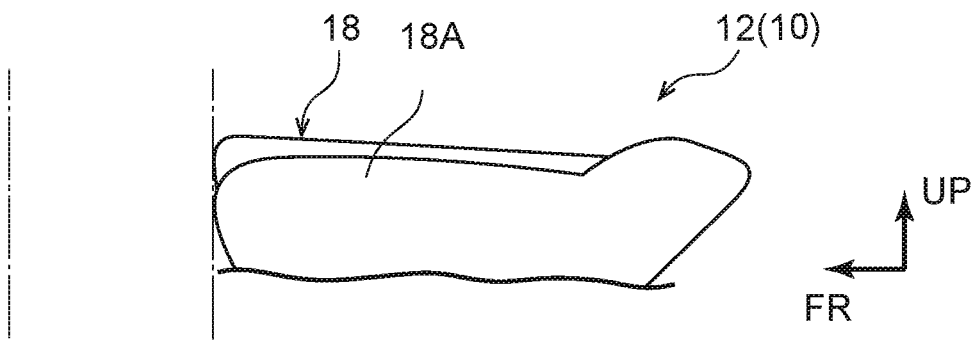
FIGS. 3A-3D are plan views schematically showing the side support portion at the time when a vehicle occupant enters a vehicle, and illustrate respective states.
Figure 4A:
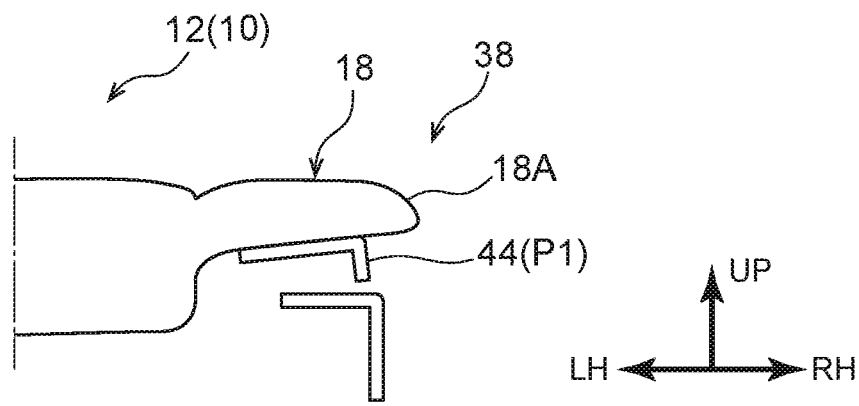
FIGS. 4A-4D are rear views schematically showing the side support portion, and the states thereof correspond to the states of FIG. 3A through FIG. 3D, respectively.

As in the state of FIG. 3A and the state of FIG. 4A, in order for a vehicle occupant to sit in the vehicle seat 10 that is the driver's seat, in the state in which the front side door is opened, the side support portion 18 that is at the right side of the seat cushion 12 is in a lowered state. Therefore, in the present embodiment, the side support portion 18 at the right side becoming a hindrance to entry of the vehicle occupant into the vehicle can be suppressed.

Figure 3B:
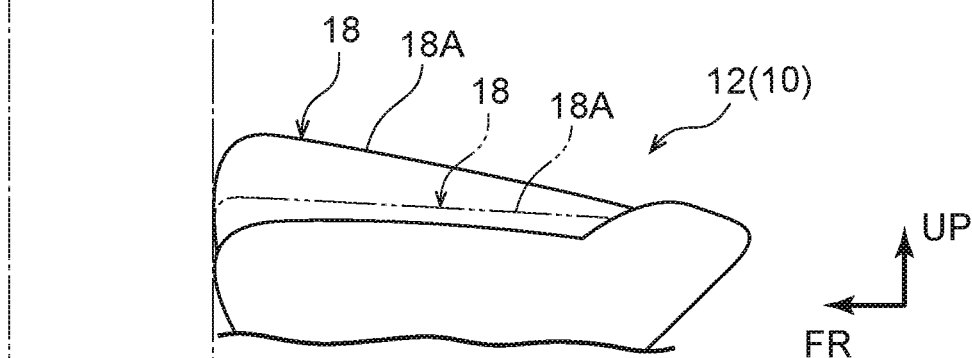
Figure 3C:
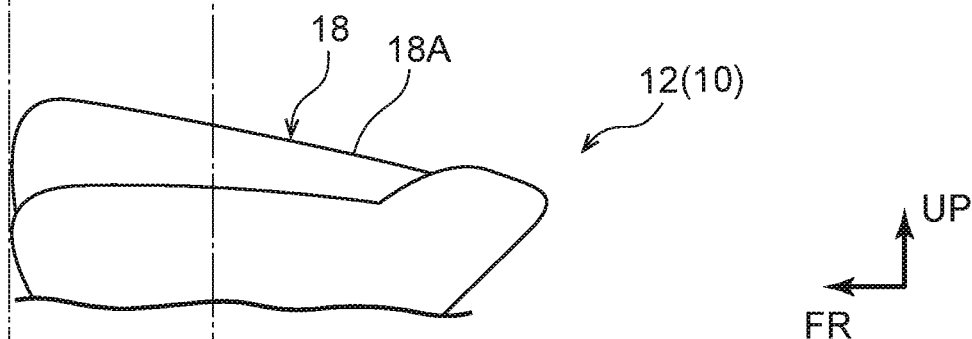
Figure 4B:
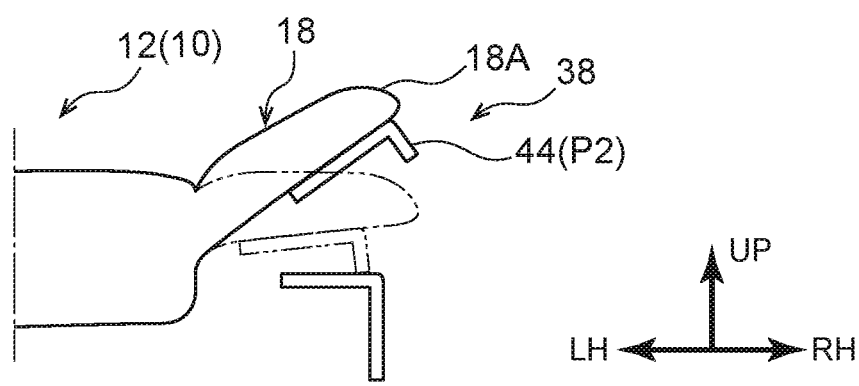
Figure 4C:
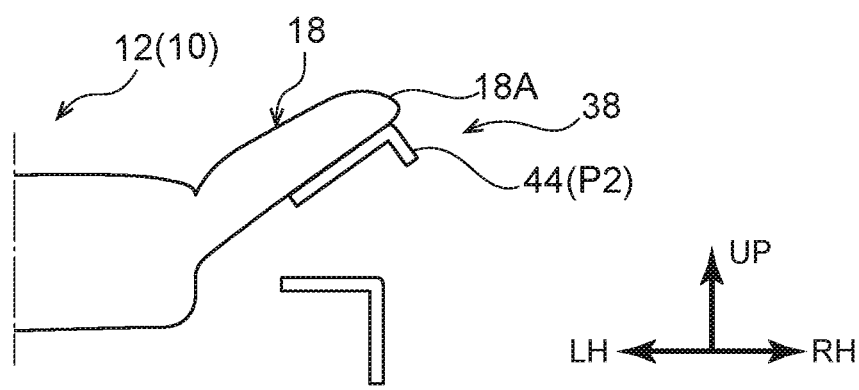

As in the state of FIG. 3B and the state of FIG. 4B, after the vehicle occupant sits down in the vehicle seat 10, due to the vehicle occupant sliding the support lock releasing lever 44 to the release position P2, the side support portion 18 at the right side can be raised (pulled upward), and as in the state of FIG. 3C and the state of FIG. 4C, the front-rear position of the vehicle seat 10 can be adjusted to a position at which driving is easy.

Figure 3D:
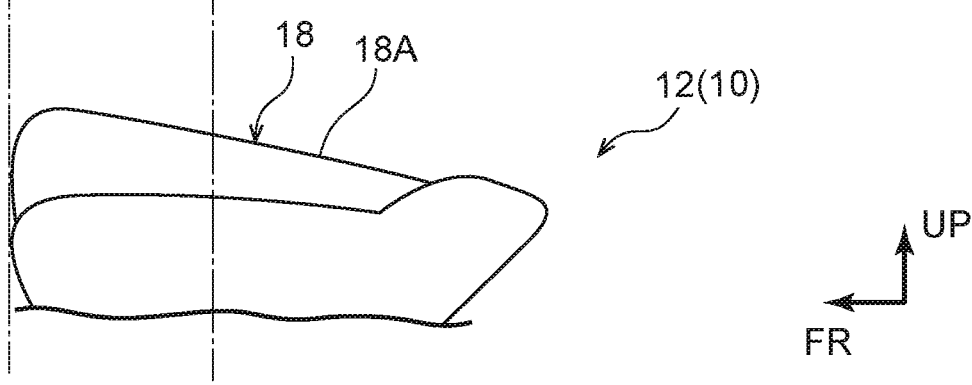
Figure 4D:
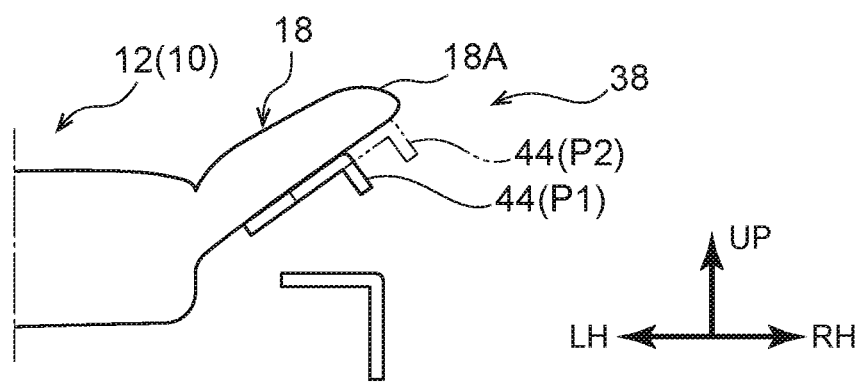

Further, as in the state of FIG. 3D and the state of FIG. 4D, due to the vehicle occupant letting go of the support lock releasing lever 44, and the support lock releasing lever 44 being moved from the release position P2 to the lock position P1, the side support portion 18 at the right side is held in the state of being tilted toward the upper side, and sliding of the vehicle seat 10 in the front-rear direction is restricted.

Next, the time when a vehicle occupant exits the vehicle is described by using FIG. 5 and FIG. 6.

Figure 5A:
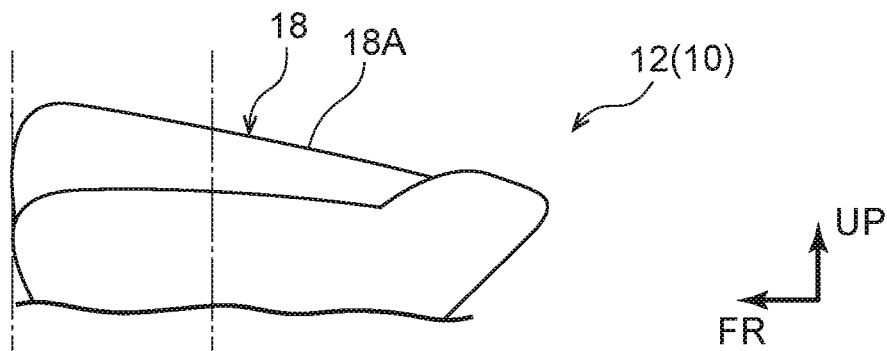
FIGS. 5A-5D are plan views schematically showing the side support portion at the time when a vehicle occupant exits the vehicle, and illustrate respective states.
Figure 5B:
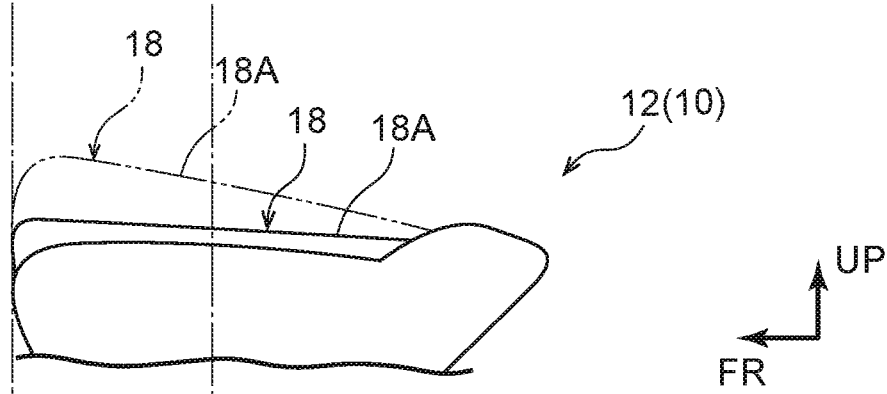
Figure 5C:
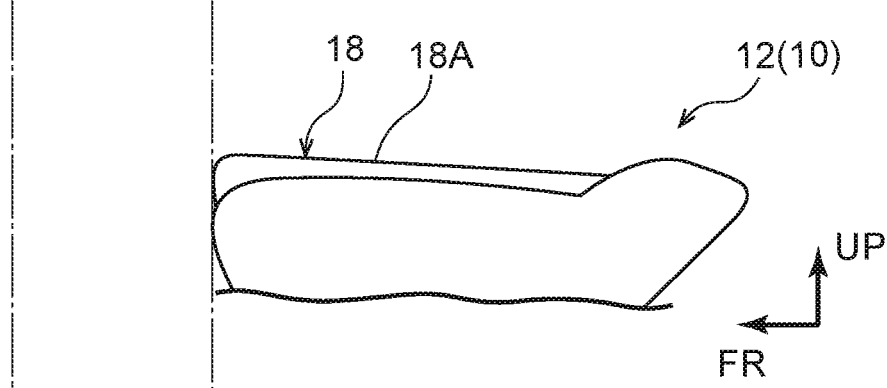
Figure 6A:
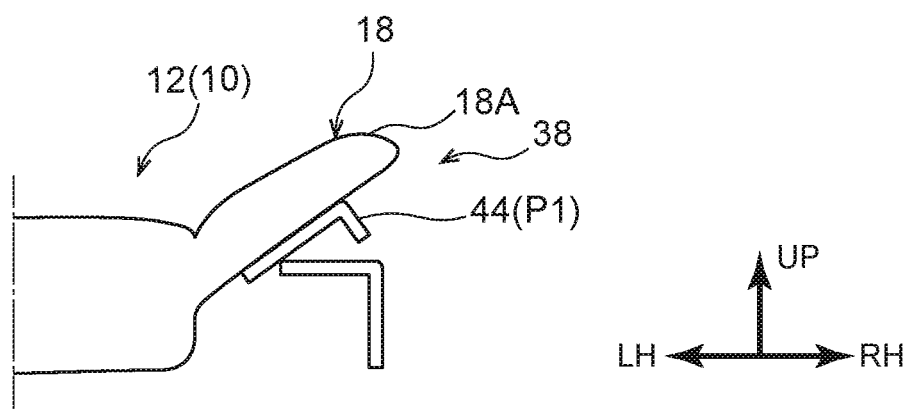
FIGS. 6A-6D are rear views schematically showing the side support portion, and the states thereof correspond to the states of FIG. 5A through FIG. 5D, respectively.
Figure 6B:
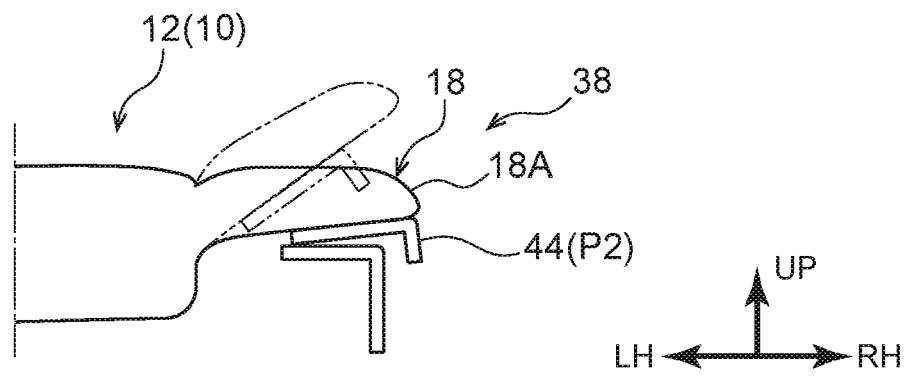
Figure 6C:
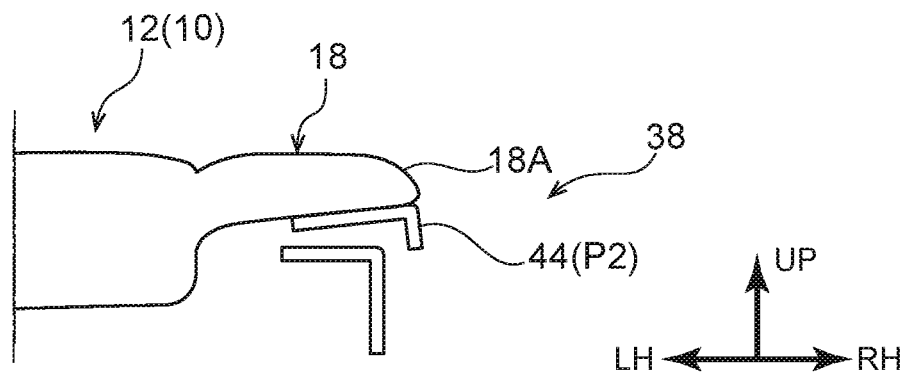

The vehicle seat 10 in a state in which a vehicle occupant is seated thereon is shown in FIG. 5A and FIG. 6A. In this state, as in the state of FIG. 5B and FIG. 6B, due to the vehicle occupant sliding the support lock releasing lever 44 to the release position P2, the side support portion 18 at the right side can be lowered (moved downward), and, as in the state of FIG. 5C and the state of FIG. 6C, the front-rear position of the vehicle seat 10 can be adjusted to a position at which exiting from the vehicle is easy.

Figure 5D:
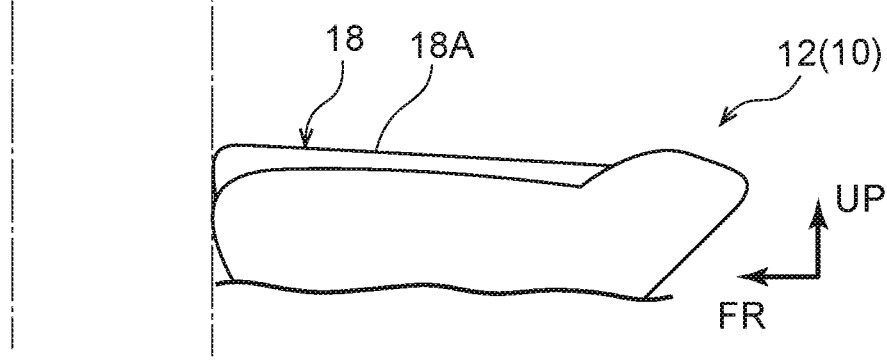
Figure 6D:
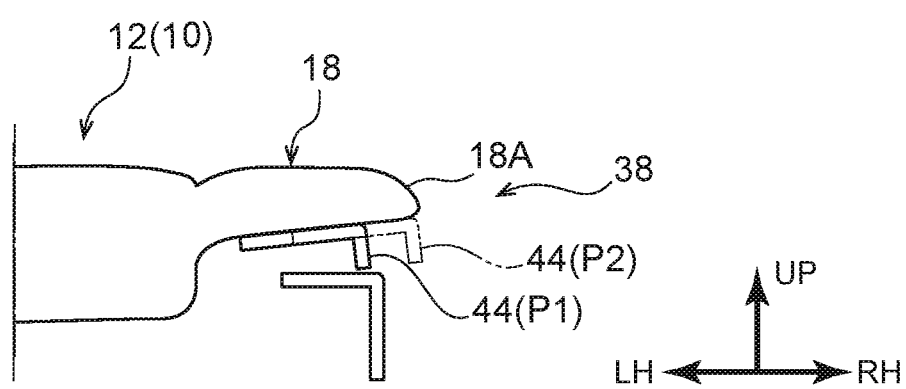

Further, as in the state of FIG. 5D and the state of FIG. 6D, due to the vehicle occupant letting go of the support lock releasing lever 44, and the support lock releasing lever 44 being moved from the release position P2 to the lock position P1, sliding of the vehicle seat 10 in the front-rear direction is restricted. Due thereto, in the present embodiment, the side support portion 18 at the right side becoming a hindrance to the vehicle occupant exiting from the vehicle can be suppressed.

As described above, in accordance with the vehicle seat 10 of the present embodiment, the ease of entry and exit of a vehicle occupant into and from the vehicle can be improved.

Further, in accordance with the vehicle seat 10 of the present embodiment, due to the side support portion urging spring 54 being provided, the side support portion 18 can be lowered by the urging force of the side support portion urging spring 54.

Moreover, in the present embodiment, due to the support lock releasing lever 44 being provided at the lower side of the side support portion 18, the vehicle occupant can tilt the side support portion 18 while operating the support lock releasing lever 44.

Further, in the present embodiment, due to the loop handle 32 (see FIG. 2) being provided in addition to the support lock releasing lever 44, the vehicle seat 10 can be slid in the front-rear direction in a state in which displacement of the side support portion 18 is restricted (a state in which the side support portion 18 is not lowered).

Note that, although the present embodiment describes an example in which the loop handle 32 is provided, the present invention is not limited to this. Whether or not to provide the loop handle 32 may be selected appropriately in consideration of the position at which the vehicle seat 10 is provided, or the like.

Further, the present embodiment describes an example in which the support lock releasing lever 44 is provided at the lower side of the side support portion 18, but the present invention is not limited to this. The position at which the support lock releasing lever 44 is provided may be set appropriately in consideration of the operability of the support lock releasing lever 44 by the vehicle occupant, or the like.

Moreover, although the present embodiment describes an example in which the side support portion 18 is lowered by the urging force of the side support portion urging spring 54, the present invention is not limited to this. The urging force of the side support portion urging spring 54 may be urging force of an extent of assisting at the time when the vehicle occupant moves the side support portion 18 downward. Further, there may be a structure in which the side support portion urging spring 54 is not provided.

Although an embodiment of the present invention has been described above, the present invention is not limited to the above, and can of course be implemented by being modified in various ways other than the above, within a scope that does not depart from the gist thereof.

What is claimed is:

1. An entry/exit support structure of a vehicle seat, comprising:
    a side support cushion portion of a seat cushion, the side support cushion portion being provided at at least one side in a seat transverse direction of the seat cushion on which a vehicle occupant sits such that in a lowered position, an upper surface of the side support cushion portion forms a continuation of the seat cushion and is generally in the same plane as an upper surface of the seat cushion, and the side support cushion portion is configured to be displaced in a seat vertical direction such that the upper surface of the side support cushion portion rises out of the plane;
    a seat sliding mechanism that supports the seat cushion to be configured to slide in a seat front-rear direction, and that has a locking device that restricts sliding of the seat cushion in the seat front-rear direction; and
    a side support cushion portion restricting mechanism that has a release operation portion comprising a support lock releasing lever operated by a vehicle occupant, the support lock releasing lever being connected to the locking device,
    wherein moving the support lock releasing lever into a state in which the release operation portion is positioned at a lock position restricts displacement of the side support cushion portion in the seat vertical direction, and, moving the support lock releasing lever into a state in which the release operation portion is positioned at a release position causes both the restricting mechanism and the locking device to be released such that both displacement of the side support cushion portion in the seat vertical direction and sliding of the seat cushion in the seat front-rear direction are permitted.

2. The entry/exit support structure of a vehicle seat of claim 1, wherein the side support cushion portion includes a side support cushion portion urging member, and the side support cushion portion urging member urges the side support cushion portion in a direction of being displaced toward a seat lower side.

3. The entry/exit support structure of a vehicle seat of claim 1, wherein the release operation portion is provided at a seat lower side of the side support cushion portion.

4. The entry/exit support structure of a vehicle seat of claim 1, wherein a slide permitting operation portion is provided at a lower side of the seat cushion at a position different than the release operation portion, and due to the slide permitting operation portion being operated, sliding of the seat cushion in a seat front-rear direction is permitted while the support structure is in a state in which displacement of the side support cushion portion in the seat vertical direction is restricted.

5. The entry/exit support structure of a vehicle seat of claim 1, wherein the side support cushion portion restricting mechanism has a first cable and a second cable, and when the release operation portion is operated, the first cable is pulled and sliding of the seat cushion in the seat front-rear direction is permitted, and the second cable is pulled and displacement of the side support cushion portion in the seat vertical direction is permitted.

6. The entry/exit support structure of a vehicle seat of claim 5, wherein the side support cushion portion restricting mechanism further has a lock plate whose proximal end side is joined to a shaft portion, and that is formed in a shape of a plate that extends toward a radial direction outer side of the shaft portion, and an engaged plate having a lock hole that restricts rotation of the shaft portion due to a distal end portion of the lock plate being engaged with the lock hole, the engaged plate being tiltably supported via a pin.

7. The entry/exit support structure of a vehicle seat of claim 6, wherein, when the second cable, which is directly connected to the engaged plate, is pulled, the engaged plate is tilted toward one side, and the distal end portion of the lock plate is pulled-out from the lock hole of the engaged plate, and restriction of rotation of the shaft portion is released, and the release operation portion enters a state of being positioned at the release position.

\* \* \* \* \*